Dec. 4, 1956   E. MANNING, JR   2,772,748
CONTACTING FLUIDS WITH ENTRAINMENT AND INERTIA SEPARATION
Filed July 21, 1953   4 Sheets-Sheet 1

Inventor:
Earl Manning, Jr.
By Oswald H. Withmore
His Attorney

Dec. 4, 1956  E. MANNING, JR  2,772,748
CONTACTING FLUIDS WITH ENTRAINMENT AND INERTIA SEPARATION
Filed July 21, 1953  4 Sheets-Sheet 3

Inventor: Earl Manning, Jr.
By Oswald H. Milmore
His Attorney

United States Patent Office 2,772,748
Patented Dec. 4, 1956

2,772,748
CONTACTING FLUIDS WITH ENTRAINMENT AND INERTIA SEPARATION

Earl Manning, Jr., Houston, Tex., assignor to Shell Development Company, Emeryville, Calif., a corporation of Delaware Application July 21, 1953, Serial No. 369,387

18 Claims. (Cl. 183—22)

This invention relates to a method and apparatus for contacting a liquid with another fluid, particularly a gas. The invention finds especial although not exclusive application in such fields as fractional distillation of petroleum and the like, and in cooling and scrubbing gases. The expression gas is employed herein to include any matter existing in the gaseous state, including simple and complex vapors as well as air and fixed gases.

Conventional contacting towers for effecting contact between countercurrently flowing gases and liquids, e. g., in the distillation art, employ a series of trays forming stages and liquid flows downwardly from tray to tray, with temporary retention on each tray, and ascending vapors pass through bubble caps or holes in the tray and flow through the retained liquid to effect contact therewith. To increase the efficiency of contacting and the gas-handling capacity of such towers high gas velocities are usually desirable, but the maximum permissible gas velocity is limited by the requirement that liquid be not entrained by the ascending gas and carried into the next higher stage. To obtain high gas capacity within the permissible upward gas velocities, attempts have been made in columns having liquid-transport downcomers to devote as great a proportion of the cross sectional area of the column as possible to the flow of gas, and from 88 to 94% of such area is often utilized for the upflow of gas above the tray, the remainder being occupied by downcomers, etc. Entrainment can be reduced somewhat, resulting in slightly higher permissible gas velocities, by using higher vertical intervals between trays and/or by mounting disentrainment devices, such as screens, mats, or the like, between the trays; but the improvements attainable by these expedients are limited and involve an increase in the height of the column and/or the use of flow passages that are subject to obstruction and create undesirably high pressure drops.

In another known type of contact apparatus, which may be called the vertical arrangement, liquid is supplied to an imperforate feed plate much smaller in area than the cross sectional column area and the liquid is deliberately entrained in a gas vortex formed by inward tangential flow of gas between inclined blades of a tuyere above the liquid on the feed plate to form a gas vortex having a central low pressure core; the liquid is drawn upward to form a whirling annulus of liquid within the tuyere and surrounding the core, and is discharged tangentially at the top of the tuyere by centrifugal force while the gas continues to flow upwards. A large part of the energy required to induce such gas flow is expended in overcoming friction losses inherent in maintaining the high velocity vortices, that is, in overcoming the dry tray pressure drop. Also, only a small part of the space within the tuyere is devoted to effecting intimate contact between the gas and liquid because the liquid is, for the main part, concentrated in a comparatively dense annulus, so that the space within the column is not efficiently utilized.

It is an object of the invention to provide an improved method and apparatus for contacting a liquid with a fluid wherein far higher velocities of said fluid are employed than in the conventional tray towers having settling or fall-out spaces between the trays, and wherein more efficient use is made of the energy applied to induce flow and/or of the space within the column than in the prior vortical arrangements.

A specific object is to provide an improved contacting method and apparatus wherein a liquid is admitted to an entraining zone while a fluid is passed upwardly at high velocity to entrain all of the admitted liquid to form a dispersion, and the said dispersion is subsequently separated into its constituents by inertia, involving the flow of the dispersion in a laterally confined path with a sudden change of direction.

In summary, according to the invention, liquid is passed in succession from stage to stage to form in each stage a liquid contacting body, e. g., a layer supported on a suitable support member, e. g., a grid, screen, or perforated plate which may include a mixing nozzle, and the gas is passed upwardly at high velocity through the support member and in direct lateral contact with and, preferably, as a multitude of streams that flow through the contacting body, to disrupt the contacting body into small particles or drops by direct engagement therewith and to entrain substantially all of the liquid, forming a dispersion consisting of gas containing dispersed drops of liquid; the dispersion is then flowed in a confined path with a sudden change of direction, e. g., by deflection against a wall or baffle, to effect separation of entrained liquid drops by inertia, and the liquid is permitted to fall out from the gas stream and is collected whilst the gas, substantially free from liquid, is transferred to the preceding stage of the series to form the high velocity stream therein. Advantageously the gas stream, after the change in direction, has a linear velocity that is lower than the linear upward velocity thereof at the point at which it entrains the liquid, and this subsequent flow is preferably less turbulent so as to facilitate the fall-out of liquid. This is best achieved by providing a horizontal flow channel or a channel having at least a major horizontal component, of greater total cross sectional area than the cross sectional area of the duct through which the gas-liquid dispersion moves immediately after leaving the contacting body.

The apparatus comprises an upright tower containing vertically spaced tray assemblies, each pair of adjacent assemblies defining a contact stage including an entrainment zone and a separation zone situated at least partially laterally with respect to the entrainment zone, the tray assemblies providing in each entrainment zone a gas duct in gas-receiving relation to a lower separation zone, means for maintaining a contacting body of liquid for direct lateral contact with and entrainment by gas ascending the gas duct including a liquid-support member for the liquid having a channel through which the gas flows, a partition wall extending upwardly from the support member and separating the entrainment and separation zones, said zones being in communication through a passageway at a level above the support member, e. g., over the partition wall, a deflecting wall at the top of the entrainment zone for deflecting a two-phase stream consisting of gas and entrained liquid into the said passageway for entry of both the gas and liquid into the separation zone with a sharp change in direction, and a liquid downcomer for feeding liquid onto said support member from a separation zone above the respective pair of assemblies. The separation zone advantageously has a baffle, such as a curved or flat plate, depending from the top thereof near said passageway for causing the entering two-phase stream to flow beneath the baffle and to isolate the upper part of the separation zone from the entrainment zone. The said passageway may be merely an opening above said partition wall, or may include one or more flow channels between a series of tangentially arranged vanes forming a cyclone for admitting the two phase stream into the separation zone with a swirling motion and further facilitate separation of the entrained liquid from the gas.

The entraining action according to the invention is positive, by direct contact of the entraining gas laterally with the contacting body of liquid, instead of vortical; hence, there is no dependence upon the generation of a vacuum above the body of liquid for aspirating or drawing up the liquid. As a result the gas disrupts the liquid into drops and entrains the drops more effectively and a large part of the energy corresponding to the pressure drop between stages is expanded in disrupting the liquid to expose surfaces thereof, thereby causing more intimate contact between the gas and liquid. Moreover, since the action is not vortical, there is no pronounced rotary motion of the dispersion ascending from the contacting body of liquid and pronounced localization of the liquid in the peripheral portion of the dispersion; instead, the dispersion contains liquid drops dispersed throughout the cross sectional area. A precisely uniform ratio of gas to liquid over the cross section need not, of course, occur and in certain embodiments a certain amount of rotation of the dispersion may occur, causing an alteration in the distribution of the liquid drops. This distribution of the liquid drops in the entraining gas over the area of the gas stream, which is important for effecting good contact, is promoted by the turbulent flow of the gas, which causes mixing and promotes distribution of liquid over the whole cross sectional area of the ascending gas even though the initial distribution of liquid at the point of entrainment may have been poor; however, it is in most instances preferred to provide reasonably uniform distribution of liquid also at the point of entrainment and this is achieved by a distributor that subdivides the gas current and passes it through the contacting body as several smaller currents that reunite after traversing the liquid and being laden with liquid.

The invention may be practiced in apparatus of several forms, a few of which are shown in the accompanying drawings forming a part of this specification by way of illustration, wherein.

Referring to the drawings in detail, and particularly to Figures 1–4, the upright column 10 represents a portion of a contacting tower, such as a fractionating tower provided with the conventional means for supplying a material to be distilled, for drawing off top and bottom products, and for providing reflux at the top and vapors at the bottom; such items being well known in the art, they are omitted from the drawing.

The column contains a plurality of contacting tray assemblies of which only some appear in the drawings, each adjoining pair defining a stage. These assemblies may be of identical construction but installed with alternate orientations. Each assembly includes a horizontal deck 11 supported from and sealed to the tower wall by any suitable means and having a gas opening 11a defining a gas duct or channel for the upflow of gas and an opening 11b for the downflow of liquid. The former is advantageously provided with a perforate horizontal gas distributor 12 for subdividing the gas into a number of smaller currents that pass through liquid that flows onto the member 12 and occurs thereon substantially as a horizontal layer; however, in some instances, as when very small openings are used, this perforate member 12 may be omitted and the opening 11a may then function as a simple mixing nozzle. The imperforate liquid supply part 11c of the tray serves as the liquid-support member for maintaining a contacting body of liquid and the distributor 12, when provided, also serves as such a support member. Various types of distributors, such as screens, grates and plates with holes may be used and are shown herein in different embodiments; in this embodiment a grate having parallel bars 13 is shown. The bars are mounted in a frame having side members 14 and 14a in parallel relation to provide slots 15 that preferably have uniform widths throughout the area of the grate. The bars may be from one-quarter to two inches in horizontal width and the slots may have widths from one-fourth to twice the widths of the bars, greater relative widths being employed with high gas velocities and with narrow bars; however, the invention is not restricted to such dimensions. By way of a specific example found to give excellent results, the bars are ¾ in. high, ¼ in. wide and the slots are 5/16 in. in width. The frame carries at one side a weir 16 and at the other a baffle 17 that is preferably somewhat higher than the weir and curved away from the grate and constitutes a partition wall separating the entrainment zone, which is immediately above the grate, from the laterally adjacent separation zone. The baffle 17 terminates short of the next higher tray to leave a passageway for entry of gas and entrained liquid into the separation zone. The weir 16 is optional but preferred. The opening 11b is provided with a downcomer for liquid comprising an inclined part 18, a vertical inner wall 19, and an arcuate outer wall 20 that is joined to the inclined and vertical walls. The tray assemblies are mounted in the column so that each downcomer terminates a short distance from the next lower plate, somewhat below the top of the weir thereof, above the imperforate portion 11c of the tray that is situated adjacent to the weir. A depending deflecting baffle 21 may be mounted on each tray in the separation zone near the passageway above the baffle 17 to further isolate the top part of the separation zone from the entrainment zone and deflect the gas downwards. To reduce friction losses, that is, to reduce the dry tray pressure drop, this baffle may be curved as shown.

In operation, liquid descends through the tower from stage to stage through the downcomers and onto the supply zones 11c, from which liquid overflows the weirs 16 and is supplied continuously onto the distributors 12 to form in each entrainment zone a contacting body of liquid in the form of a horizontal layer. The region of the tray at the opening 11a, including the distributor 12, constitutes the entrainment zone of the stage and it is evident that liquid supplied to each entrainment zone, except that of the uppermost stage (not shown) is derived from an adjacent, higher stage, liquid to the uppermost stage being supplied from an external source or generated at the top by a reflux condenser. The gas, e. g., vapors in equilibrium with the liquid in the adjacent lower stage or, in the case of the lowermost stage, introduced from an external source or generated at the bottom by a vaporizing or reboiler device, ascends as a high velocity gas stream through the openings 11a in the trays, passing through the slots 15 of the distributor as a multitude of discrete streams and coming into lateral contact with the body of contacting liquid to entrain the liquid as small drops. The gas velocity is such that liquid is prevented entirely or for the most part from draining down through the slots 15 but is, instead, entrained by the gas substantially at the rate at which it is supplied to the entrainment zone; in other words, substantially total entrainment of liquid is effected but the contacting body of liquid is continuously replenished so that the grate 12 is never dry. This action forms a high velocity, turbulent, two-phase stream consisting of gas and entrained liquid drops. The two-phase stream is highly turbulent and the liquid drops are distributed over the entire cross sectional area thereof, thereby effecting intimate contact between gas and liquid. While some degree of rotary motion may occur, as described in connection with Figures 7–12, vortical movement, if present, is not so strong as to cause a significant increase in concentration of liquid at the peripheral part of the stream. High velocity in the gas causes forces that further tend to disrupt liquid drops into smaller drops to expose new liquid surfaces to the gas.

The proper gas velocity to effect such total entrainment of liquid can be readily determined empirically; it may be stated that this total entraining action can be achieved over a wide range of gas flow rates, so that the vapor velocity is not critical for a given liquid rate except as noted below. As the rate at which liquid is admitted to the entrainment zone is increased, progressively higher gas velocities are required to effect total entrainment, i. e., the lower limit of the operative range of gas velocities rises. The upper limit of this range of gas velocities, known as the flood point, is determined by the action in the separating zone, as described below, wherein substantially all of the liquid drops must be disengaged from the gas; this upper limit becomes lower with increasing liquid flow rates. Hence, it is evident that the operating range of gas velocities becomes narrower with increasing liquid flow rates, the maximum liquid-handling capacity of the tower being that at which the lower and upper limits of the range of gas velocities become equal.

Figure 1:
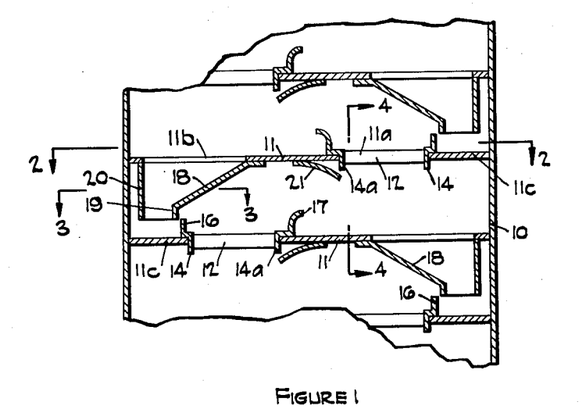
Figure 1 is a vertical sectional view showing a portion of a tower constructed in accordance with the invention.
Figure 2:
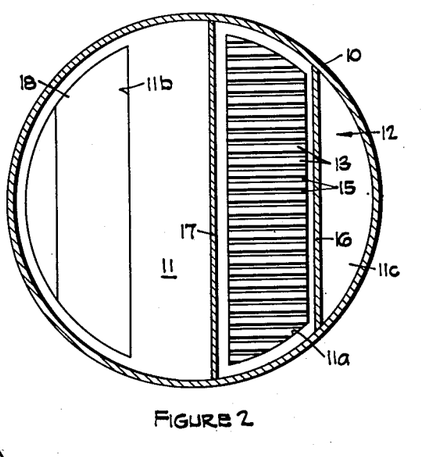
Figure 2 is a horizontal sectional view taken on the broken line 2—2 of Figure 1.
Figure 3:
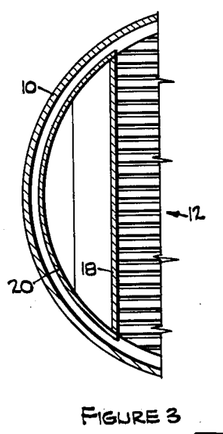
Figure 3 is a fragmentary horizontal sectional view taken on the line 3—3 of Figure 1.
Figure 4:
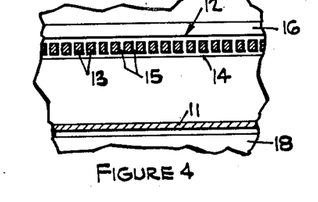
Figure 4 is a fragmentary vertical sectional view taken on the line 4—4 of Figure 1.

The ascending two-phase stream is deflected by the underside of the downcomer wall 18 and by the bottom of the next higher tray, which constitute the deflecting wall at the top of the entrainment zone to cause a sudden change in the direction of movement toward the horizontal upon entering the enlarged separation or fall-out zone beyond the partition wall 17 and above the opening 11b. The gas is further deflected downwardly by the depending baffle 21 and flows through the separation zone with a major horizontal velocity component, and at a reduced linear velocity due to the enlarged cross sectional area of this zone. It is evident from the drawing that the flow area of this zone first becomes wider in the direction of gas flow because the stream moves toward the central part of the tray where the length of a chord across the column is greater; beyond the center of the tray the separation zone is increased vertically because of the inclination of the wall 18. When the stream is thus sharply deflected, the liquid drops in the two-phase stream change direction less sharply and become to a large extent concentrated at the side of the stream near the deflecting walls, thereby causing coalescence into large drops, which can more readily settle through the gas in the separation zone. This action is herein designated separation of phases by inertia. The liquid moves downwardly into the downcomer which is very wide at the upper parts thereof, to afford ample opportunity for release of gas that may be occluded in the liquid, e. g., in the form of foam; as a result the column of liquid that collects in the downcomer has a high density and exerts a large hydrostatic head, causing a high rate of liquid flow onto the adjacent lower tray despite a high pressure drop between stages. The gas, substantially free from entrained liquid, ascends through the gas opening in the adjacent higher tray to constitute the high velocity gas stream therein.

It will be noted that the construction and operation described above involve the use of only a small part of the total tray area or cross sectional area of the tower for the upflow of gas through the liquid; thus, the openings 11a occupy only about 10 to 40% of the total tray area, in contrast to conventional designs of columns having downcomers wherein 88 to 94% of the total area are devoted to this purpose. Yet the column according to this invention is capable of handling gas at a higher rate in relation to the column cross sectional area than such conventional columns. Another characteristic of primary importance is that by operating at such high gas velocities, very high contacting efficiencies were attained; this may be due at least in part to the high disruptive force of the gas which divides the liquid into small drops and which, by its turbulence, insures that all parts of the gas come into contact with the liquid drops.

Figure 5:
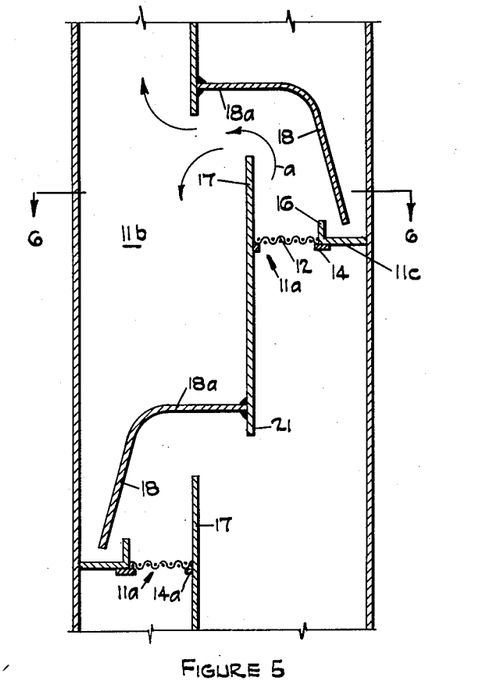
Figure 5 is a vertical sectional view showing a portion of a tower constructed in accordance with a modification.

In conventional tray fractionating columns, including those with liquid downcomers and those wherein liquid moves downward through the vapor openings in the trays, the maximum permissible vapor velocity, corresponding to the flood point, is limited by the entrainment and the permissible maximum vapor velocity increases somewhat with increasing vertical tray spacing. However, this permissible vapor velocity approaches assymptotically a limiting value known as the limiting vapor velocity for infinite tray spacing; such columns cannot be operated above such limiting vapor velocity regardless of the tray spacing so long as the separation of vapor from liquid is dependent upon the fall-out of liquid particles through an ascending stream of vapor. With the arrangement according to the invention vapor capacities close to this limiting vapor velocity are attainable even with reasonably close tray spacing, that is, for a given tray spacing more vapor can be handled before reaching the flood point. Thus, with the construction according to Figures 1–4, using a column five feet in diameter with trays one foot apart, the vapor capacity was about equal to that of a bubble cap tray column at two-foot tray spacing in which 90% of the column area between trays were devoted to vapor flow. It was found that the baffles, especially the baffle 21 (which may be shaped as shown in Figure 5) was important in achieving these results; when this baffle was omitted permissible vapor capacity, while good in comparison to prior art arrangements, was somewhat lower.

The movement of gas at such high velocities, e. g., from 20 to 42 ft. per second through the slots 15, and at correspondingly high velocities through the passages above the support member may be expected to cause considerable pressure drop between stages. However, the total pressure drop through a stage is made up of two parts, of which the first is the dry tray pressure drop and the other the residual pressure drop, sometimes known as the contacting head. The former is the pressure drop that occurs when gas at the volumetric flow rate and density as occur during actual operation is passed through the tray without liquid. The latter is the difference between the total pressure drop during operation with liquid and the dry tray pressure drop and is indicative of the energy expended in breaking up the liquid to form surfaces, i. e., it gives an indication of the degree of contacting. It was found that according to the invention the residual pressure drop is large showing that energy is expended effectively for performing the intended purpose of effecting good contact between the gas and liquid.

Figure 6:
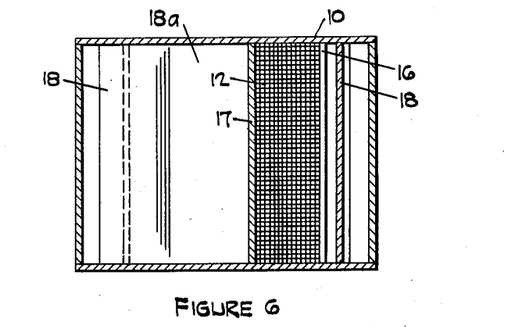
Figure 6 is a horizontal sectional view taken on the line 6—6 of Figure 5.

Still higher vapor velocities and correspondingly higher vapor capacities (and improved apparent contacting efficiencies due to decreased entrainment) can be attained by using greater tray spacing, thereby providing a taller separation zone through which the two-phase stream can flow at lower velocity, but at a decrease in the number of stages for a column of a given height. Such an embodiment is shown in Figures 5 and 6 which further illustrate certain other variants that can be applied individually or in combination to the embodiment of Figures 1–4. In this view, parts corresponding to those of the previous embodiment bear like numbers. The tower 10 is here shown to be rectangular in cross section. Each tray has a narrow imperforate liquid-receiving and liquid-support portion 11c adjoining the gas channel 11a, which has a screen 12 as the perforated gas-distributing member; this screen also acts as a liquid-support member. The weir 16 is formed integrally with the tray and the downcomer opening 11b is enlarged to occupy over half of the column width. The partition wall 17 extends farther above the gas distributor and extends also downwardly to beneath the upper, horizontal part 18a of the downcomer wall 18 to form a depending baffle 21, which is in this case shaped as a flat vertical plate.

Operation of this device is the same as that previously described, with the differences that the turbulent two-phase stream flowing upwardly between the wall 17 and the under-side of the downcomer wall 18, as indicated by the arrow a, travels a greater distance before being sharply deflected laterally into the separating zone beyond the wall 17 and that the latter zone is considerably enlarged.

A particularly high gas-handling capacity can be attained by the embodiment shown in Figures 7–12, wherein the two-phase stream is passed through a cyclone in addition to being deflected, thereby improving separation of liquid. These views further show a special although optional construction of the tray assemblies permitting individual insertion into the column or tower 10, all assemblies being identical but being assembled with alternating orientations.

Figures 7, 8, 9, 10:
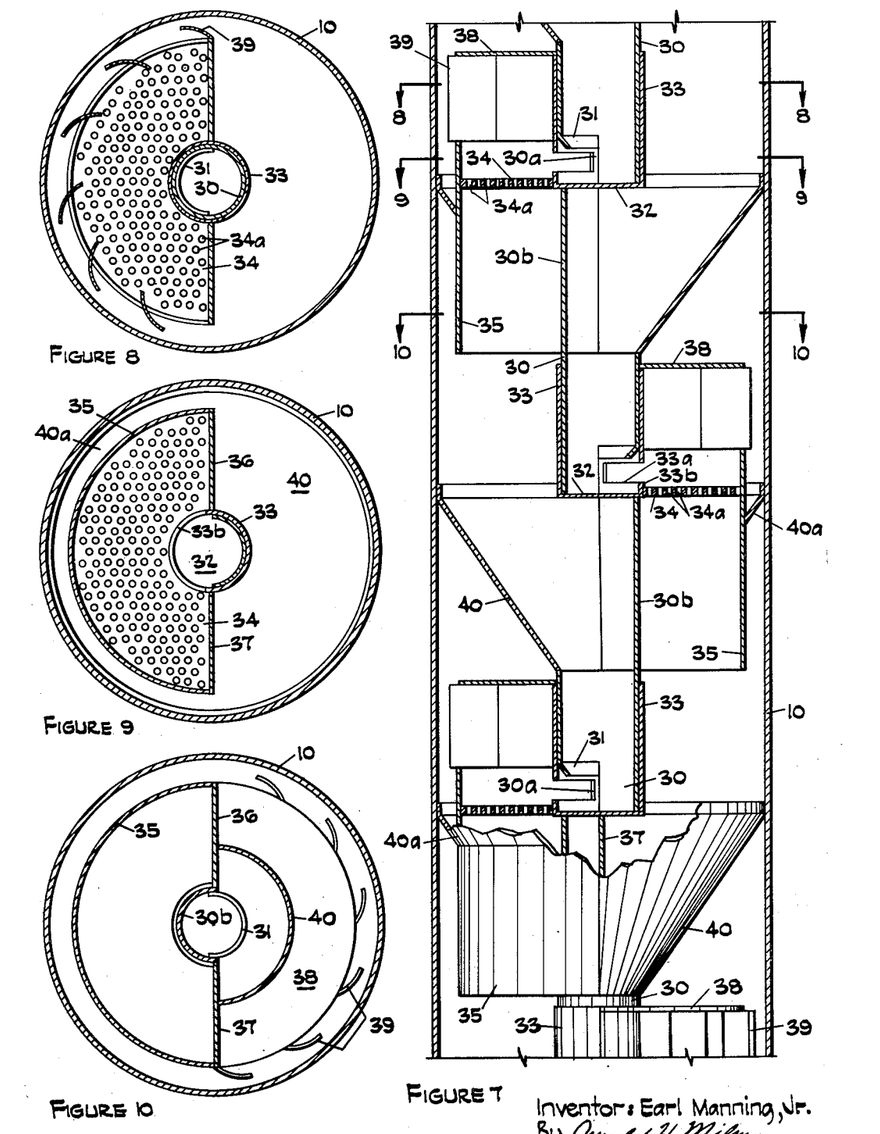
Figure 7 is a vertical sectional view of a portion of a tower constructed in accordance with a further modification.
Figures 8, 9 and 10 are horizontal sectional views taken on the correspondingly numbered section lines of Figure 7.
Figure 11:
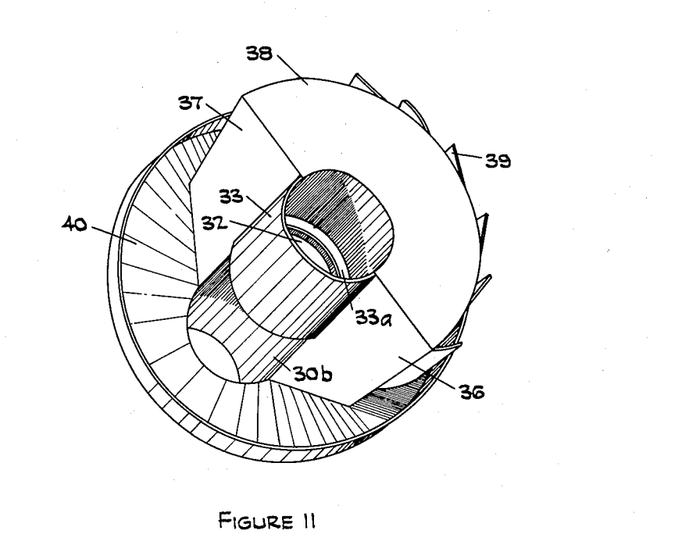
Figures 11 and 12 are pictorial views showing different aspects of one of the tray assemblies used in the tower according to Figure 7.
Figure 12:
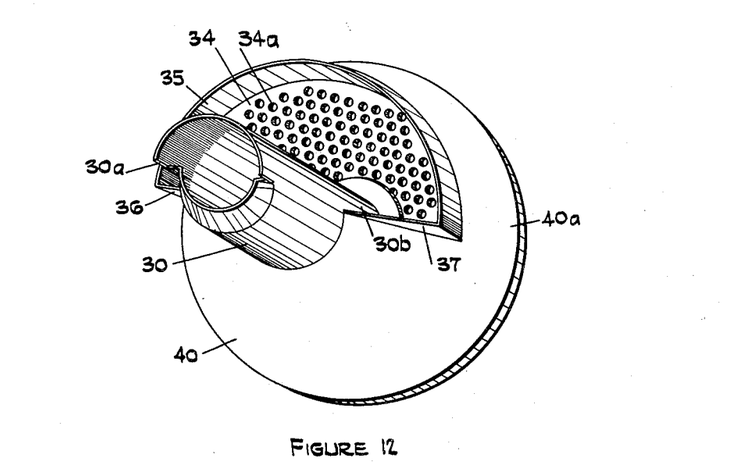

Considering first the construction of a single tray assembly, at the bottom thereof is a vertical, axial downcomer tube 30 of circular cross section adapted to have a sliding fit within the top of the next lower tray for support thereby and having a part of the bottom edge cut away at one side through an arc of about or slightly more than 180°, to provide a lateral liquid discharge port 30a. The top edge of this port may be bent inward to form a lip 31; this facilitates insertion into the next lower assembly. At the top of the downcomer tube 30 is a tube extension 30b, which communicates with and may be integral with the downcomer tube and may be of like diameter but is semi-circular in cross section, with one side thereof fully open to the same side as the port 30a, as indicated in Figures 7, 10 and 12, for inflow of liquid. The top of the tube extension is closed by a circular, imperforate disc 32, which is fixed thereto and which supports the tube 30 of the next higher assembly. On top of the disc 32 is fixed a vertical, axial, positioning tube 33 having an internal diameter equal to the external diameter of the downcomer tube 30, for receiving the downcomer tube of the next higher assembly. The positioning tube has a discharge port 33a cut into the side thereof opposite that of the port 30a of the same assembly, extending circumferentially through an arc of about 180° and displaced upwards from the disc 32 so as to form an arcuate overflow weir 33b. A plate 34 in the shape of a circular ring sector of 180° is fixed to the side of the disc 32 to be immediately adjacent the port 33a; this may be made integral with the said disc but is preferably thicker, as shown. This plate has a plurality of holes 34a and constitutes the perforated gas distributor; it further functions as a part of the liquid-support member for the liquid contacting body, the other part being the disc 32. A vertical arcuate wall 35, extending through an arc of 180°, is fixed to the outer, arcuate margin of the plate 34 and extends downwardly therefrom to about the level of the bottom of the tube extension 30b; the vertical margins of this arcuate wall are joined to the tube extension 30b by radial, vertical walls 36 and 37, to define together with the radially outer side of the tube extension 30b and the wall 35 a vertical gas duct that is open at the bottom and has a cross sectional shape conforming to that of the perforated plate 34. The wall 35 also extends above the perforated plate 34 to a height slightly above the top of the port 33a, to constitute the partition wall separating the entrainment zone from the separation zone that lies in part between the wall 35 and the tower wall 10. The radial walls 36 and 37 extend to the top of the positioning tube 33, and the inner margins of the upper parts of these radial walls are connected to the tube 33, as shown in Figures 8, 9 and 11. These radial walls also constitute partition walls between the entrainment and separation zones. An imperforate plate 38 of shape conforming to that of the plate 34 is fixed to the top of the positioning tube 33 and to the top margins of the walls 36 and 37, being positioned directly above and in spaced relation to the plate 34 to form the wall at the top of the entrainment zone. A plurality of vanes 39 are mounted between the upper edge of the wall 35 and the plate 38, inclined to the radius so as to form a cyclone providing a plurality of outlet passages that are tangential to the central vertical axis of the tray assembly and distributed circumferentially over half a circle. A frusto-conical collecting funnel 40 diverges upwardly from the bottom of the tube extension 30b and is vertically co-extensive therewith, the outer, upper rim of the funnel being sealed to the column 10 by a close fit or other suitable means. The lower part of the sector of the funnel toward the wall 35 is omitted, as shown, and in that sector only the upper part 40a, outside of the said wall, is provided. The funnel 40 is the upper part of the liquid downcomer and also constitutes the bottom of the separation zone.

The several tray assemblies are emplaced in the column from the top and may be inserted singly or assembled above the column and lowered as a unit. Each downcomer tube 30 is inserted into the positioning tube 33 of a lower assembly so as to bring the ports 30a and 33a into alignment.

In operation, liquid moving down through the column enters each stage onto the funnel 40 thereof, and flows into the tube extension 30b through the open side thereof and thence downwardly through the downcomer tube 30. The liquid is supported on each disc 32 and is discharged from the latter through the aligned ports 30a and 33a, overflowing the arcuate weir 33 and flowing radially onto the perforated plate 34 to form a contacting body of liquid thereon. At high liquid flow rates a column of liquid is built up within the downcomer, and this column has a high density because occluded gas has ample opportunity to escape from the space within the funnel 40, which has a large horizontal area. Gas from a lower stage enters the gas duct within the arcuate wall 35 outwardly of the tube extension 30b and ascends through the perforations 34a as a plurality of small gas streams to entrain the liquid at the rate at which it is supplied, i. e., to effect total entrainment and form a turbulent, two-phase stream consisting of gas and liquid drops, as previously described. This stream enters the space within the vanes 39 and is deflected by the wall 38 to undergo a change in direction from the vertical to the horizontal, flowing outwardly between the baffles in a plurality of horizontal directions that have tangential components with respect to the tower wall 10, so as to acquire a swirling movement. This cyclone action promotes separation of the entrained liquid drops by inertia, the drops being hurled against the wall 10 and falling into the funnel 40 of the next lower stage, while the gas, substantially free from entrained liquid, moves up into the gas duct of the next higher stage. The space within the column wall 10 and outside the cyclone is enlarged, so that the gas flows through it at reduced velocity that facilitates the fall-out of liquid.

In a column constructed according to Figures 7–12, having an internal diameter of 11.75 in. and a height of 12 in. per actual stage, vapor capacities as high as 161% of the limiting vapor velocity for conventional trays with infinite tray spacing were attained.

*Example*

Two series of distillations of a mixture consisting of 25% by volume of isooctane and the balance toluene were performed at an absolute pressure of one atmosphere in a laboratory column containing seven trays of a type similar to that shown in Figures 7 to 12 but with the cyclones and perforated plates situated at the center of the tray and using flat discs instead of the conical funnel 40. The said discs were spaced apart vertically by 2.25 in. lengths of glass tubing 1.5 in. in internal diameter. The glass tubing fitted closely against the column wall and formed a lining. In the first series the total area of the perforated member was 0.25 sq. in. and in the second series it was 0.21 sq. in., these being 15.3% and 11.9%, respectively, of the total tray area. In each series distillations were performed at different vapor flow rates by varying the heat input. The results are given in the following table:

FIRST SERIES

| Overhead Vapor Rate, cc./hr. | Pressure Drop per Tray, mm. of Hg | Tray Efficiency, percent |
|---|---|---|
| 3,400 | 0.3 | 47 |
| 5,700 | 0.3 | 43 |
| 6,000 | 0.3 | 39 |
| 8,500 | 0.4 | 36 |
| 9,700 | 0.4 | 36 |
| 11,400 | 0.5 | 34 |
| 13,400 | 0.6 | 33 |
| 20,000 [1] | | |

SECOND SERIES

| | | |
|---|---|---|
| 11,000 | 1.1 | 43 |
| 17,000 | 2.1 | 45 |
| 20,000 [1] | | |

[1] Flood point.

These tray efficiencies were lower than those obtained in conventional glass laboratory distillation columns with perforated plates of the type known as Oldershaw columns; however, the vapor capacity was considerably greater. For purposes of comparison, under like operating conditions, such conventional columns of like diameter would be at the flood point with an overhead vapor rate of only 9,000 cc. per hour.

I claim as my invention:

1. Method of contacting a liquid with a fluid having a different density, which comprises the steps of: continuously supplying said liquid to an entrainment zone and forming therein a horizontal layer of the liquid; flowing said fluid at a high upward velocity in lateral contact with said layer of liquid and entraining liquid in the fluid substantially at the same rate as that at which liquid is supplied to said zone and forming a high velocity, confined upwardly moving two-phase stream containing liquid distributed over the cross sectional area thereof and in turbulent motion, said liquid being discharged from the entrainment zone substantially only by entrainment in said fluid; flowing said stream in a confined path with a sudden change in direction and at reduced velocity through a separation zone which has an enlarged cross sectional area and is isolated from said entrainment zone and thereby effecting separation of the phases thereof by inertia; and separately collecting the separated phases.

2. Method according to claim 1 wherein the major component of the direction of flow through the separating zone extends horizontally, whereby said fluid moves substantially horizontally to facilitate separation of said phases.

3. Method according to claim 1 wherein the step of flowing the stream in a confined path with a change of direction includes flowing all parts of said two-phase stream with a swirling motion tangentially outwardly from the axis of said stream into a confined separating zone.

4. Method according to claim 1 wherein the said fluid is passed upwards as a plurality of streams distributed over said layer of liquid, each of said streams traversing said layer and the several streams being reunited above said layer.

5. Method of contacting liquid with a gas in a series of contact stages, which comprises the steps of: flowing gas at high upward velocity through each stage; within each stage supplying liquid laterally into said gas, entraining substantially all of the supplied liquid in said gas, and forming a high-velocity, upwardly moving, two-phase stream consisting of gas and dispersed liquid drops that are distributed over the cross sectional area of the current, the liquid for each stage except the first of the series being derived from a preceding stage; separating the said entrained liquid drops from the entraining gas in each stage by inertia by deflecting the gas to cause a sudden change in the direction of flow thereof and flowing it at reduced velocity through a separating zone which is isolated from the zone at which said entrainment occurs; collecting the separated liquid in the separating zone of each stage and transferring the collected liquid from each stage except the last stage of the series directly to a subsequent stage; and passing residual gas, substantially free from entrained liquid, from each stage except the first stage of the series to a preceding stage.

6. Method of contacting gas and liquid countercurrently in a series of contact stages situated at different levels, which comprises the steps of: continuously supplying liquid to each stage, liquid for each stage except the highest being supplied by gravity flow from a higher stage; in each stage flowing gas upwards as a high velocity stream in lateral contact with said liquid, entraining said liquid in said gas stream substantially at the rate at which it is supplied to the respective stage, and forming a turbulent, two-phase stream ascending at high velocity and consisting of gas and dispersed liquid drops distributed over the cross sectional area of the stream; deflecting each said two-phase stream toward a horizontal direction to effect a sudden change in the direction thereof and thereby effecting separation of said liquid drops by inertia; flowing each deflected stream through a fall-out zone which is isolated from the zone at which said entrainment occurs with reduced linear velocity; collecting separated liquid beneath each fall-out zone as a continuous body of liquid and transferring said collected liquid from each stage except the lowermost stage directly to a lower stage; discharging the residual gas substantially free from liquid upwardly from each fall-out zone; and transferring said discharged residual gas from the fall-out zone of each stage except the highest stage to a higher stage to constitute the high velocity stream therein.

7. Method of contacting gas and liquid countercurrently in a series of contact stages each of which comprises an entrainment zone and a separation zone isolated from the entrainment zone thereof, which method comprises the steps of: supplying liquid to each entrainment zone, liquid for each entrainment zone except that of the first stage of the series being derived from a preceding stage, and forming a horizontally extended contacting body of liquid in each entrainment zone; in each stage flowing gas upwards as a multiplicity of divided high velocity streams through said contacting body of liquid, entraining said liquid in said gas streams substantially at the rate at which it is supplied to the respective entrainment zone, and forming a turbulent, two-phase stream ascending at high velocity and consisting of gas and dispersed liquid drops distributed over the cross section area of the stream; transferring each of said two-phase streams from the respective entrainment zone to the separation zone of the same stage; reducing the velocity of flow and suddenly changing the direction of flow of the transferred stream in each separation zone, thereby separating the entrained liquid drops by inertia; collecting the separated liquid in each separation zone and transferring said collected liquid directly to a subsequent stage from each stage except the last stage of the series; and discharging the residual gas, substantially free from liquid drops, from each separation zone while passing the discharged gas from each stage except the first stage of the series to a preceding stage to constitute the high velocity stream therein.

8. Apparatus for contacting a liquid with a fluid of lower density which comprises, in combination: a laterally confined, vertically elongate fluid duct for the upflow of said fluid as a high velocity stream; means for admitting said liquid to said fluid duct at a level materially below the top thereof for lateral contact with said fluid stream and substantially complete entrainment therein to form a two-phase stream consisting of said fluid and liquid drops; a separation chamber of enlarged cross sectional area in relation to said fluid duct having an inlet connected to receive said two-phase fluid stream from the top of the fluid duct, an outlet for separated liquid isolated from said fluid duct and an outlet for fluid substantially free from liquid; and means for deflecting said two-phase stream to impart a sudden change in the direction of movement thereof to effect separation of said liquid drops from the fluid by inertia.

9. Apparatus for contacting a liquid with a fluid of lower density which comprises, in combination: a liquid-support member, said member having a channel for the upflow of said fluid in contact with liquid on said member; liquid supply means for admitting liquid onto said support member to form a contacting body of liquid thereon; a wall structure including an upstanding baffle defining a laterally enclosed entrainment chamber extending upwards from said support member for a height sufficient to prevent liquid overflow; flow means for supplying said fluid beneath said support member for upflow through the said channel in the said member and through said contacting body for substantially total entrainment of said liquid to form a two-phase stream consisting of said fluid and entrained liquid drops and ascending through said entrainment chamber; a separation chamber situated laterally with respect to said liquid-support member and isolated therefrom by said baffle having an inlet communicating with the top of said entrainment chamber for entry of said two-phase stream, said separation chamber being of enlarged cross section area in relation to said channel having a liquid discharge opening near the bottom and a fluid discharge opening near the top; and a deflecting wall for imparting a sudden change of direction to said two-phase stream upon entry into said separation chamber to effect separation of said liquid drops from the fluid by inertia.

10. Apparatus for contacting a liquid with a fluid of lower density which comprises, in combination, an upright tower and a plurality of superposed tray assemblies within said tower, each pair of adjacent assemblies defining a contacting stage including an entrainment chamber and a separation chamber situated at least partially laterally with respect to the entrainment chamber, each said pair of assemblies including: a liquid-support member in the said entrainment zone having an area materially less than the cross sectional area of said tower and the cross sectional area of the associated separating chamber, and having a confined channel for the upflow of said fluid in contact with liquid on said member, said member being disposed with the under-side thereof in fluid-receiving relation to the separation zone beneath the respective pair of assemblies for the upflow of said fluid through said channel as a high velocity stream; a wall structure laterally enclosing the part of said entrainment chamber above said liquid-support member and separating said entrainment chamber from the laterally adjacent separation chamber, said entrainment and separation chambers being in communication through a passageway elevated with respect to said liquid-support member by a distance sufficient to prevent liquid overflow; a wall at the top of said entrainment chamber for deflecting said fluid into the separation chamber with a sudden change of direction and effecting separation of liquid entrained therein by inertia; and means for feeding liquid onto said liquid-support member including a liquid downcomer disposed in liquid-receiving relation to a separation chamber above the respective pair of assemblies.

11. In combination with the apparatus according to claim 10, a baffle depending from the top of said separation chamber near to said passageway, for the entry of said fluid into the separation chamber beneath the baffle.

12. Apparatus according to claim 10, wherein said liquid downcomer includes an inclined wall constituting the bottom of said separation chamber.

13. In combination with the apparatus according to claim 10, vanes in said passageway disposed to direct said fluid outwardly with respect to the axis of said confined fluid channel into the separation chamber with a swirling movement.

14. A contacting tray assembly adapted for mounting with other like assemblies within a tower, comprising: an imperforate liquid supply plate at one side of the tray and adapted to receive liquid from above; a perforate liquid-support member immediately inwardly of said supply plate; a weir between said supply plate and perforate member; a partition wall on the side of the perforate member away from the said weir extending upwardly to a height materially in excess of the height of said weir; and an imperforate wall on the side of said partition wall away from the perforate member beneath the top of the partition wall, at least a portion of said imperforate wall being inclined away from said partition wall and downwardly to form a liquid downcomer.

15. In combination with the tray assembly according to claim 14, a baffle depending beneath said imperforate wall and situated to the side of said perforate member away from the liquid supply plate.

16. A contacting tray assembly adapted for mounting with other like assemblies within a tower, comprising: a central downcomer tube having a liquid discharge opening at the bottom; a funnel-like upwardly diverging wall extending above the bottom of said downcomer tube, said tube being in communication with the space immediately above said upwardly diverging wall to receive liquid therefrom; a perforate gas-distributing and liquid-support member situated to one side of said tube and at a level above the bottom thereof for receiving liquid from the axis of the assembly; a gas duct beneath said perforate member for receiving gas from beneath; a closure wall above said perforate member; and a lateral passageway between said closure wall and said perforate member for the lateral discharge of gas and liquid.

17. A contacting tray assembly according to claim 16 including partition wall means extending upwards from said perforate member on all sides thereof, the part of said wall means away from the said axis terminating below said closure wall to provide an opening that constitutes the said lateral passageway, said assembly having a plurality of vanes beneath said closure disposed to impart a swirling movement to fluid flowing outwardly through said lateral passageway.

18. Apparatus for contacting a liquid with a fluid of lower density which comprises, in combination, an upright tower and a plurality of superposed tray assemblies defining a series of contact stages, each stage including: a vertical downcomer tube at the axis of the tower; an inclined liquid-collecting wall above the tube for supplying liquid to said tube; a perforate liquid-support member adjoining said downcomer; a passageway between a radially inner part of said perforate member and the downcomer tube for feeding liquid from the latter onto the perforate member; a cyclone situated above each perforate member in free communication with the space above the member having outlet passages disposed tangentially with respect to the axis of the tower for discharging fluids with a swirling motion to the space outside of the cyclone, the said space outside of the cyclone being in communication with a downcomer tube extending to a lower stage and with the underside of the perforate member of a higher stage.

References Cited in the file of this patent

UNITED STATES PATENTS

| | | |
|---|---|---|
| 1,808,088 | Urquhart | June 3, 1931 |
| 2,116,933 | Ragatz | May 10, 1938 |
| 2,610,046 | Collins | Sept. 9, 1952 |
| 2,678,199 | Koch | May 11, 1954 |

FOREIGN PATENTS

| | | |
|---|---|---|
| 837,846 | Germany | May 2, 1952 |